United States Patent
Khider et al.

(10) Patent No.: US 9,769,620 B1
(45) Date of Patent: *Sep. 19, 2017

(54) ORIENTATION ESTIMATION BASED ON BACKWARD-FORWARD BAYESIAN FILTERING

(71) Applicant: Google Inc., Mountain View, CA (US)

(72) Inventors: Mohammed Khider, Santa Clara, CA (US); Brian Williams, Mountain View, CA (US); Etienne Le Grand, Mountain View, CA (US); Patrick Robertson, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/409,890

(22) Filed: Jan. 19, 2017

Related U.S. Application Data (63) Continuation of application No. 15/154,209, filed on May 13, 2016, now Pat. No. 9,581,467.

(51) Int. Cl.
| | |
|---|---|
| *H04W 24/00* | (2009.01) |
| *H04W 4/02* | (2009.01) |
| *G01C 19/00* | (2013.01) |
| *G01C 25/00* | (2006.01) |
| *G01S 19/13* | (2010.01) |

(52) U.S. Cl.
CPC ............ *H04W 4/026* (2013.01); *G01C 19/00* (2013.01); *G01C 25/005* (2013.01); *H04W 4/02* (2013.01); *H04W 4/027* (2013.01); *G01S 19/13* (2013.01)

(58) Field of Classification Search
CPC ............ G01D 5/00; G01S 19/42; H04W 4/04

USPC ............ 455/404.1, 412.1–414.2, 41.1–41.2, 455/418–422.1, 456.1, 456.2, 456.3, 457, 455/566, 552.1, 550.2

See application file for complete search history.

(56) References Cited

U.S. PATENT DOCUMENTS

| | | | | |
|---|---|---|---|---|
| 8,775,063 | B2 * | 7/2014 | Zeng ................ | B60W 40/072 342/107 |
| 9,020,191 | B2 * | 4/2015 | Gupta ............... | G06K 9/6202 382/103 |
| 9,294,876 | B2 * | 3/2016 | Haro ................. | H04W 4/023 |
| 2010/0309044 | A1 * | 12/2010 | Ische ................ | G01S 19/46 342/357.28 |

(Continued)

FOREIGN PATENT DOCUMENTS

ES    EP 2657647 A1 *   10/2013   ............ G01C 17/28

*Primary Examiner* — Babar Sarwar
(74) *Attorney, Agent, or Firm* — McDonnell Boehnen Hulbert and Berghoff LLP (57) ABSTRACT

A system includes one or more processors, and data storage configured to store instructions that, when executed by the one or more processors, cause the system to perform functions. In this example, the functions include receiving sensor data that is collected by one or more sensors of a device over one or more locations and over a time period. Further, in the present example, the functions also include determining location estimates of the device by performing filtering of the sensor data to determine offsets for a least one sensor providing sensor data. The filtering is an iterative process of filtering control input data to determine the sensor bias based on data from a second sensor of the at least two sensors and adjusting the set of sensor data based on the determined bias.

20 Claims, 5 Drawing Sheets

(56) References Cited

U.S. PATENT DOCUMENTS

| | | | | |
|---|---|---|---|---|
| 2011/0177809 A1* | 7/2011 | Pakzad | ................ | G01S 5/02 455/423 |
| 2011/0254729 A1* | 10/2011 | Dutta | ................ | G01C 21/165 342/357.3 |
| 2012/0244883 A1* | 9/2012 | Tibbitts | ................ | H04W 48/04 455/456.2 |
| 2013/0122935 A1* | 5/2013 | Das | ................ | H04W 4/028 455/456.3 |
| 2014/0072233 A1* | 3/2014 | Horwood | ................ | G06K 9/6292 382/201 |
| 2014/0074768 A1* | 3/2014 | Horwood | ................ | B64G 3/00 706/52 |
| 2014/0266789 A1* | 9/2014 | Matus | ................ | H04Q 9/00 340/870.07 |
| 2015/0119086 A1* | 4/2015 | Mirowski | ................ | G01S 5/0252 455/456.6 |
| 2016/0057726 A1* | 2/2016 | Bai | ................ | H04W 64/00 340/686.6 |

* cited by examiner

ORIENTATION ESTIMATION BASED ON BACKWARD-FORWARD BAYESIAN FILTERING

CROSS REFERENCE TO RELATED APPLICATION

The present application claims priority to U.S. patent application Ser. No. 15/154,209, filed on May 13, 2016, the entire contents of each are herein incorporated by reference.

BACKGROUND

A location of a computing device can be estimated based on Global Positioning System (GPS) signals. For example, a mobile computing device may receive GPS signals and responsively estimate the device location on the face of the Earth (e.g. an absolute location expressed by latitude and longitude values). Generally, there are various factors that influence the accuracy of estimated locations based on GPS signals. These factors may include the number of usable GPS signals from different GPS satellites or sources, the positions of GPS satellites or sources, atmospheric conditions that affect GPS signals, physical barriers (such as mountains, manmade structures, trees, and the like) that may interfere with GPS signals, movement of the computing device while GPS signals are being received and/or while the device is estimating the location, among other factors.

However, in many instances, a GPS signal may be unavailable. In addition to using GPS signals to estimate a location of a device, other sensors may be used to estimate the location and/or movement of the device. For example, a gyroscope, a magnetometer, and an accelerometer may be used to provide location data. However, a gyroscope, a magnetometer, and an accelerometer may not necessarily provide absolute global location information. Thus, these sensors may be used to estimate movement, rather than absolute position. For instance, sensors may be able to determine the movement of a respective device having the sensors.

Generally, it is desirable to improve on the arrangements of conventional methods and systems or at least to provide one or more useful alternatives to help to make localization of a computing device more efficient, reliable, and/or accurate.

SUMMARY

In one example, a system includes one or more processors, and data storage configured to store instructions that, when executed by the one or more processors, cause the system to perform functions. In this example, the functions include receiving sensor data, wherein the sensor is collected by one or more sensors of a device over one or more locations and over a time period. Further, in the present example, the functions also include determining location estimates of the device by performing filtering of the sensor data to determine offsets for a least one sensor providing sensor data.

In still another example, a method includes receiving a set of sensor data. The set of sensor data includes data from at least two sensors and the sensor data corresponds to a movement of a device having the at least two sensors. Data from a first sensor of the two sensors is used a control input data. The method also includes determining a sensor bias for a first sensor of the at least two sensors. The sensor bias is determined by filtering the control input data a first time to determine the sensor bias based on data from a second sensor of the at least two sensors, adjusting the set of sensor data based on the determined bias; filtering the control input data a second time to revise the determined sensor bias, where the filtering is performed based on the data from the second sensor of the at least two sensors, and adjusting the set of sensor data based on the revised determined bias The steps of determining the sensor bias are performed iteratively until the sensor bias converges within a convergence threshold. Additionally, the method includes storing the adjusted sensor data in response to the sensor bias converging.

In another example, a computer readable memory having stored therein instructions, that when executed by a computing device, cause the computing device to perform functions is provided. The functions receiving a set of sensor data. The set of sensor data includes data from at least two sensors and the sensor data corresponds to a movement of a device having the at least two sensors. Data from a first sensor of the two sensors is a control input data. The functions also include determining a sensor bias for a first sensor of the at least two sensors. The sensor bias is determined by filtering the control input data a first time to determine the sensor bias based on data from a second sensor of the at least two sensors, adjusting the set of sensor data based on the determined bias, filtering the control input data a second time to revise the determined sensor bias, where the filtering is performed based on the data from the second sensor of the at least two sensors, and adjusting the set of sensor data based on the revised determined bias. The steps of determining the sensor bias are performed iteratively until the sensor bias converges within a convergence threshold. Additionally, the functions include storing the adjusted sensor data in response to the sensor bias converging.

In yet another example, a mobile device is provided. The mobile device includes a plurality of movement sensors, where the plurality of sensors comprises at least two movement sensors. The mobile device further includes a processor. The processor is configured to receive a set of sensor data from the plurality of movement sensors. The sensor data corresponds to a movement of a device having the at least two sensors. Data from a first sensor of the two sensors is a control input data. The processor is further configured to determine a sensor bias for a first sensor of the plurality of movement sensors. The sensor bias is determined by filtering the control input data a first time to determine the sensor bias based on data from a second sensor of the at least two sensors, adjusting the set of sensor data based on the determined bias, filtering the control input data a second time to revise the determined sensor bias, where the filtering is performed based on the data from the second sensor of the at least two sensors, and adjusting the set of sensor data based on the revised determined bias. The steps of determining the sensor bias are performed iteratively until the sensor bias converges within a convergence threshold. Additionally, the mobile device includes a memory configured to store the adjusted sensor data in a memory in response to the sensor bias converging.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

I. Overview

In various instances, a computing device, such as a cellular phone, may perform computations to determine a location and/or movement of the device. The device location may include latitude, longitude, and elevation information or values. The movement information may include a direction, a velocity, and an orientation. Within examples, methods for computing accurate movement information for a device based on various sensor readings are described.

A computing device may include location services configured to provide location information to the mobile device. The location services may be divided into at least two different categories. First, location services may be able to provide an absolute location of the mobile device. The absolute location may be a location on the face of the Earth, as provided by a latitude, longitude, and elevation information. This latitude, longitude, and elevation information may be determined based on signals received from satellites, such as GPS signals. In some other examples, latitude and longitude information may be determined based on other signals, such as 802.11 (i.e. Wifi) signals. Although the location services may be able to provide absolute location information via GPS and/or Wifi, GPS and/or Wifi may not be able to provide fine enough location information in order to determine precise movement information. Thus, a second category of the location services may use a gyroscope, a magnetometer, and/or an accelerometer to determine movement information for the device. The movement information may include a velocity, an orientation, and a heading for the movement of the device.

In some examples, the location services may combine absolute position information with movement information. When a device enters a building, such as a shopping mall, a GPS signal may be lost. Thus, the mobile device may only know its absolute location until the GPS signal is lost. However, by using dead reckoning and movement information, the absolute location may be known based on the movement of the mobile device.

One potential issue with a dead reckoning system that the sensors may have sensor errors. Sensor errors may include sensor drift, sensor biases, and other sensor errors. Because some sensor errors may be time dependent, traditionally, relying on sensor data for movement information may produce unreliable results. That is, movement information provided by sensors may initially be accurate, but the accuracy decreases with time.

In one example described herein, the sensor measurements are used with a Bayesian Filter (e.g., an extended Kalman Filter) in order to calculate and remove sensor errors from sensor measurements. By obtaining measurements for multiple sensors over a period of time, the multiple measurements may be used with the Bayesian Filter to determine sensor errors. Once sensor errors are determined, a sensor offset may be calculated in order to increase sensor accuracy and mitigate sensor errors.

In an example, sensor data for sensors may be captured for the duration of an observation window. A Bayesian filter may use measurements from the gyroscope as a control input and measurements from at least one of the magnetometer and the accelerometer in the measurements update stage. The Bayesian filter is operated forward and backward over the observation window to determine sensor errors.

In one embodiment, the magnetometer-based and/or accelerometer-based corrections for the gyroscope control input are summed over the observation window and divided by the observations window duration to obtain an initial gyroscope bias estimate. The bias estimate from the first forward iteration can be used in the first backward iteration. An additional bias calculation may be estimated in the backward iteration. The additional bias from the backward iteration may be added to the previously estimated bias from the forward iteration. This process may be performed iteratively until the bias increments are not changing (or zero, or changing slowly).

In some examples, the gyroscope may have a slow changing error and the magnetometer (or accelerometer) may suffer from fast changing errors. For example, a magnetometer may have errors caused by magnetic distortions from metallic objects, such as the indoor environment of a building. Therefore, due to having a slow changing error, the gyroscope may be used with high confidence, while the magnetometer (or accelerometer) may be used with low confidence. Because of the different potential timing of sensor errors, the combination of the two sensor measurements allows the two sensors to complement each other.

Magnetometer sensor measurements may be used with low confidence to avoid the error caused by magnetic disturbances in indoor environments. However, by using the magnetic field measurement (i.e. magnetometer sensor measurements) to provide corrections across gyroscope sensor data in a forward and backward manner, the magnetometer measurements can provide an enhanced correction to the gyroscope sensor data. The magnetic measurements may be used to iteratively correct the calculated orientations over multiple backward and forward iterations. After few iterations the dead reckoning calculated over the captured data window will be better oriented relative to magnetic north. For example, the system may be configured to perform iterations to revise the sensor data until the sensor data converges within a predetermined threshold.

In some examples, a starting angle for the movement of the device is initialized based on a first magnetic measurement. However, the initial angle may be wrong due to a magnetic disturbance. Nevertheless, the angle will be corrected using estimated orientations from the past and the future when applying the backward-forward Kalman filtering as previously described. The estimated dead reckoning from the last iteration forward and the last iteration backwards may be averaged (linearly or using a sigmoid) resulting in an improved dead reckoning calculation in both directions.

The calculations described herein may be performed by the computing device (such as a mobile phone) or some other remote computing device (such as, a server). In some examples, the sensor data may be captured and stored in a memory on the computing device. A processor of the computing device may perform the calculations of the sensor data within the computing device itself. In some other examples, the computing device may communicate the stored sensor data to a remote server to perform the calculations. In yet some other examples, both the computing device and the server may perform the calculations. In examples where both the processor of the computing device and the server perform the calculations, the computing device may to a portion of the calculations which can be supplemented by the calculations performed by the server. Calculations may be performed by the server in order to reduce the processing requirements of the computing device. By reducing the processing used by the computing device, the battery life of the computing device may be extended.

II. Example Systems and Devices

Figure 1:
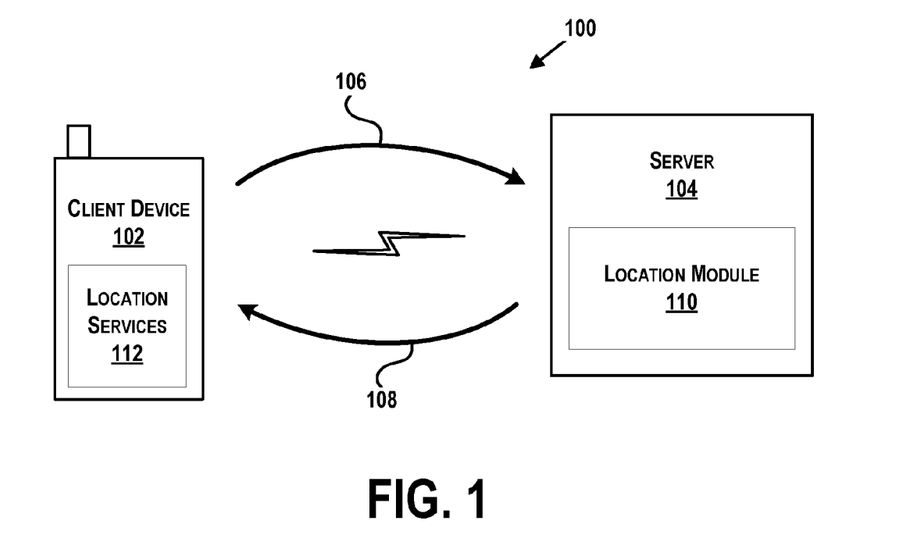
FIG. 1 illustrates an example communication system in which an example method may be implemented.

Referring now to the figures, FIG. 1 illustrates an example communication system 100 in which an example method may be implemented. In FIG. 1, a client device 102 may communicate with a server 104 via one or more wired and/or wireless interfaces. The client device 102 and the server 104 may communicate within a network. Alternatively, the client device 102 and the server 104 may each reside within a respective network.

The client device 102 may be any type of computing device or transmitter including a laptop computer, a mobile telephone, a tablet computing device, and the like, that is configured to transmit data 106 to and/or receive data 108 from the server 104 in accordance with the method and functions described herein. The client device 102 may include a user interface, a communication interface, a processor, and data storage comprising instructions executable by the processor for carrying out one or more functions relating to the data sent to and/or received by the server 104. The client device 102 may process and store location sensor information by its location services module 112. The location services module 112 may be configured to receive and store sensor information collected by the client device 102. The location services module 112 may use the sensor information to determine a movement parameter and/or a location parameter for the client device 102. The location services module 112 may also be able to determine offsets for at least a portion of collected sensor data, as discussed here. The user interface for the client device 102 may include buttons, a touchscreen, a microphone, and/or any other elements for receiving inputs, as well as a speaker, one or more displays, and/or any other elements for communicating outputs.

The server 104 may be any entity or computing device arranged to carry out the method and computing device functions described herein. Further, the server 104 may be configured to send data 108 to and/or receive data 106 from the client device 102. The server 104 may include a location module 110 which may be configured to process the data 106 received from the client device 102 to determine a movement parameter and/or a location associated with the client device 102. The location module 110 of the server 104 may also be configured to determine offsets for at least a portion of collected sensor data from the client device 102.

The data 106 received by the server 104 from the client device 102 may take various forms. For example, the client device 102 may provide information indicative of a location of the client device 102, movement of the client device 102, or sensor data measured by client device 102. The server 104 may then process the data 106 to determine adjustments to the sensor data.

In addition, the data 108 sent to the client device 102 from the server 104 may take various forms. For example, the server 104 may send to the client device 102 an indication of movement, determine sensor adjustments, or corrected sensor data.

Figure 2:
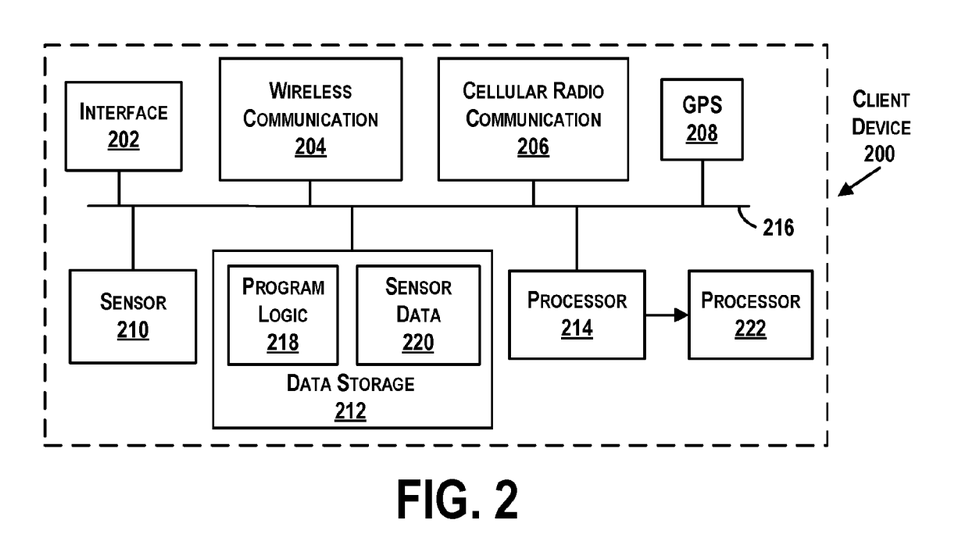
FIG. 2 illustrates a schematic drawing of an example device.

FIG. 2 illustrates a schematic drawing of an example computing or client device 200. In some examples, one or more components illustrated in FIG. 2 may be distributed across multiple computing devices. However, for the sake of example, the components are shown and described as part of one example client device 200. The client device 200 may be or may include a mobile device, desktop computer, email/messaging device, tablet computer, or similar device that may be configured to perform the functions described herein.

In some implementations, the client device 200 may include a device platform, which may be configured to operate a mobile operating system. The device platform may include different applications and an application framework, as well as various kernels, libraries, and runtime entities. In other examples, other formats or systems may operate the client device 200 as well.

The client device 200 may include one or more interface(s) 202, wireless communication component(s) 204, cellular radio communication component(s) 206, a global position system (GPS) 208, sensor(s) 210, data storage 212, and/or processor(s) 214. Components illustrated in FIG. 2 may be communicatively coupled together by a communication link or bus 216. The client device 200 may also include hardware to enable communication within the client device 200 and between the client device 200 and another computing device, such as a server entity. The hardware may include transmitters, receivers, and antennas, for example.

In one example, the interface 202 is configured to allow the client device 200 to communicate with another computing device, such as a server. Thus, the interface 202 may be configured to receive input data from one or more computing devices, and may also be configured to send output data to the one or more computing devices. In some examples, the interface 202 may also maintain and manage records of data received and sent by the client device 200. In other examples, records of data may be maintained and managed by other components of the client device 200. The interface 202 may also include a receiver and transmitter to receive and send data. In other examples, the interface 202 may also include a user-interface, such as a keyboard, microphone, touchscreen, etc., to receive inputs as well.

The wireless communication component 204 may be a communication interface that is configured to facilitate wireless data communication for the client device 200 according to one or more wireless communication standards. For example, the wireless communication component 204 may include a WiFi communication component that is configured to facilitate wireless data communication according to one or more IEEE 802.11 standards. As another example, the wireless communication component 204 may include a Bluetooth communication component that is configured to facilitate wireless data communication according to one or more Bluetooth standards, or other short-range wireless communications. Other examples are also possible.

The sensor 210 may include one or more sensors, or may represent one or more sensors included within the client device 200. Example sensors include an accelerometer, gyroscope, magnetometer, pedometer, barometer, light sensors, microphone, camera, or other location and/or context-aware sensors.

In one example, the processor 214 may be configured to determine one or more geographical location estimates of the client device 200 using one or more location-determination components, such as the wireless communication component 204, the cellular radio communication component 206, the GPS 208, and/or the sensors 210. For instance, the processor 214 may use a location-determination algorithm to determine a location of the client device 200 based on signal received by the GPS 208 of the client device 200. In another example, the processor 214 may be configured to determine a movement of the client device 200 using one or more location-determination components, such as the sensors 210. For instance, the processor 214 may use the accelerometer, gyroscope, and/or magnetometer to determine the motion of the client device 200.

In an instance, the processor 214 may use both the GPS 208 and sensor data from the one or more sensors 210 to determine a movement of the client device 200. For instance, the GPS 208 may provide the client device 200 with an estimate of the location of the client device 200. As the client device 200 moves, the location provided by the GPS 208 may update to correspond with the movement of the client device 200.

However, in some instances, the location information provided by the GPS 208 may have a resolution that is not fine enough to determine movement information. For example, a GPS 208 may provide location information accurate to 25 meters. Therefore, the client device 200 may supplement the information from GPS 208 with information from sensors, such as the accelerometer, gyroscope, and/or magnetometer. However, in some instances, the client device 200 may be unable to receive a signal via the GPS 208. In instances where the GPS 208 may not be able to receive a signal, the client device 200 may determine location information based on information from the various sensors of the client device 200.

In a further instance, to determine a movement of the client device 200, the processor 214 of the client device 200 may use a measurement and/or signal from the accelerometer, gyroscope, and/or magnetometer. In some examples, the client device 200 may primarily use one sensor, such as the gyroscope, to determine the movement. The client device 200 may supplement the information from the gyroscope with information received from other sensors, such as the accelerometer and magnetometer. By combining information from more than one sensor, the accuracy of the determined movement of the client device 200 may be increased.

In a further instance, the sensors used to determine the movement of the client device may have an associated sensor error. The processor 214 may be used to determine sensor offsets. The sensor offsets may be used to correct information received from the sensors. By correcting the sensor information, a more accurate determination of the movement of the client device 200 may be calculated.

The data storage 212 may store program logic 218 that can be accessed and executed by the processor 214. The data storage 210 may also store collected sensor data 220 that may include data collected by any of the wireless communication component 204, the cellular radio communication component 206, the GPS 208, and any of sensors 210.

The communication link 216 may include wired and/or wireless connections. For example, the communication link 216 may be a wired serial bus such as a universal serial bus or a parallel bus, or a wireless connection using, e.g., short-range wireless radio technology, communication protocols described in IEEE 802.11 (including any IEEE 802.11 revisions), or Cellular technology, among other possibilities.

The client device 200 is illustrated to include an additional processor 222. The processor 222 may be configured to control other aspects of the client device 200 including displays or outputs of the client device 200 (e.g., the processor 222 may be a graphics processing unit (GPU)). Example methods and processes described herein may be performed individually by components of the client device 200, or in combination by one or all of the components of the client device 200. In one instance, portions of the client device 200 may process data and provide an output internally in the client device 200 to the processor 222, for example. In other instances, portions of the client device 200 may process data and provide outputs externally to other computing devices.

Figure 3:
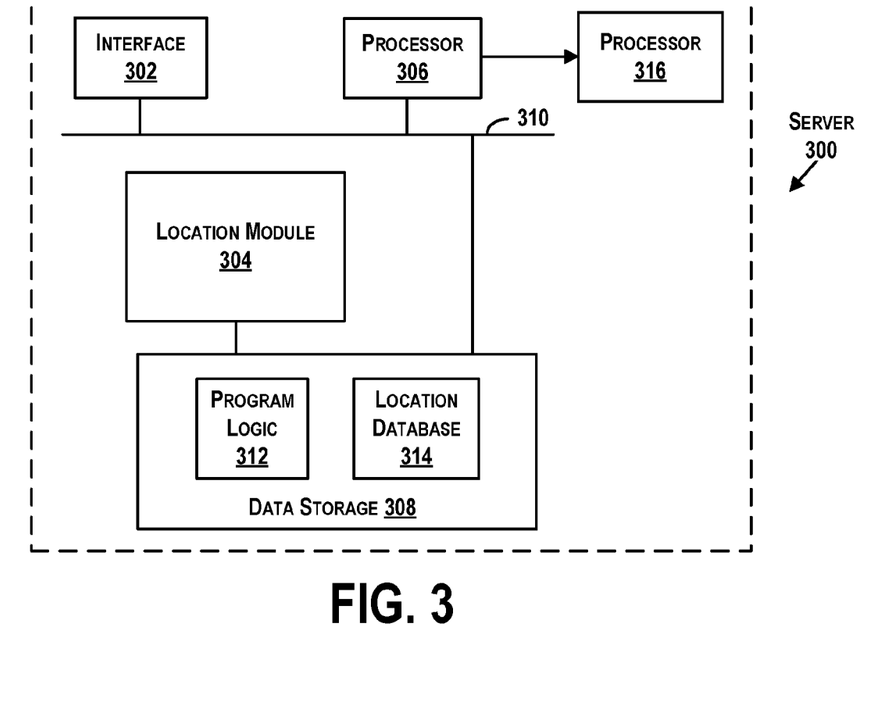
FIG. 3 illustrates a schematic drawing of another example computing device.

FIG. 3 illustrates a schematic drawing of another example computing device or server 300. In some examples, one or more components illustrated in FIG. 3 may be distributed across multiple servers. However, for the sake of example, the components are shown and described as part of one example server 300. The server 300 may represent a computing device, cloud, or similar entity that may be configured to perform the functions described herein.

The server 300 may include communication interface(s) 302, location module(s) 304, processor(s) 306, and data storage 308. The components illustrated in FIG. 3 may be coupled together by a communication link or bus 310 (e.g., wired and/or wireless links). The server 300 may also include hardware to enable communication within the server 300 and between the server 300 and another computing device (such as the device 200 of FIG. 2). The hardware may include transmitters, receivers, and antennas, for example.

In one embodiment, the communication interface 302 may allow the server 300 to communicate with another device, such as a mobile phone, personal computer, etc. Thus, the communication interface 302 may be configured to receive input data from one or more computing devices, and may also be configured to send output data to the one or more computing devices. In some examples, the communication interface 302 may also maintain and manage records of data received and sent by the server 300. In other examples, records of data may be maintained and managed by other components of the server 300.

The location module 304 may be configured to receive data from a client device and to determine a movement of the client device. The determination of the movement may be based on outputs of an accelerometer, gyroscope, magnetometer, or other sensors of the client device, as well as based on location determinations of the client device. The location module 304 may further be configured to determine and store a history of sensor measurements of the client device for later processing based on updated data pertaining to networks or information used to the determine the locations.

The data storage 308 may store program logic 312 that can be accessed and executed by the processor 306. The data storage 310 may also include a location database 314 that can be accessed by the processor 306 as well, for example, to retrieve information regarding wireless access points, locations of satellites in a GPS network, floor plans of a building, etc., or any other type of information useful for determining a movement of a client device.

The server is illustrated with a second processor 316, which may be an application specific processor for input/output functionality. In other examples, functions of the processor 306 and the processor 316 may be combined into one component.

Within examples, measurements collected from various sensors of a device (such as WiFi components, GPS sensors, gyroscope, magnetometer, and accelerometer) can be combined with information from external databases (such as known locations of WiFi access points or building floor plans) to estimate a location or movement of the device in real-time. Recording the real-time location estimate at all times (or intervals/increments of time) may also produce a location history.

III. Example Methods and Functionality

Figure 4:
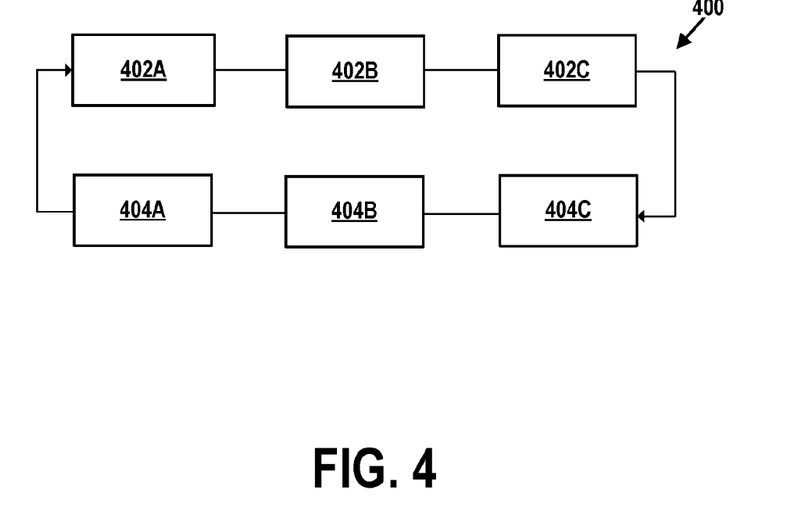
FIG. 4 is a flow diagram illustrating an example method for determining a movement of a device.

FIG. 4 is a flow diagram illustrating an example method flow for determining sensor offsets when determining a movement of a device. During the operation of the device, data from the various sensors on the device may be saved as traces. Traces may be data files that contain sensor data and/or other information from sensors.

Traces received from devices may include a variety of measurements from multiple different sensors, and may include a variety of measurements collected over time or at various locations. A trace may refer to a sensor log or a collection of data output from sensors on the device over some time period and collected over a number of locations. The sensors that output data may be selected, or data to be included within the sensor log may also be selected. In some examples, a trace of data may include all data collected by a device (using a number of sensors) over a given time frame (e.g., about 5 seconds, or perhaps about 5 minutes long or any ranges therein or longer). Measurements in a trace or from trace to trace may be considered statistically independent. However, in instances in which the measurements are collected from positions/locations in close proximity or collected close in time, the measurements may have correlations.

Initially, computing device(s), operated by users, may traverse areas in an environment and output traces from the various sensors as the device moves. A device operated by a user may output traces 402A-402C and 404A-404C passively (e.g., the device may be configured to output the trace data with no additional user input), including raw data output by sensors of the device like accelerometer data, gyroscope data, and magnetometer data, GPS data, etc. Each trace 402A-402C and 404A-404C may be associated with a time the data was collected, and thus, for traces that include GPS data, other data in the traces 402A-402C and 404A-404C also have location-specific references.

In some instances, the traces 402A-402C and 404A-404C may not contain GPS data. The traces 402A-402C and 404A-404C may include other sensor data that may be indicative of the movement of the computing device. For example, traces 402A-402C and 404A-404C may include information from a gyroscope, magnetometer, and an accelerometer. Further, as previously described, each trace of traces 402A-402C and 404A-404C may correspond to sensor data received over a period of time. For example, each trace traces 402A-402C and 404A-404C may contain 5 seconds worth of sensor data. Each trace traces 402A-402C and 404A-404C may contain data from one or more sensors.

Traces 402A-402C may be three traces that are captured in a linear time sequence. For example, trace 402A may include 5 seconds of sensor data, 402B may contain the next 5 seconds of sensor data, and 402C may contain the 5 seconds of sensor data after that. In some examples, the traces are adjacent in time with each other. That is, when one trace ends, the next trace begins. In other examples, the traces may have a time delay between them or the traces may overlap in time.

In some examples, the computing device may receive and store sensor data as one continuous trace. A processor of the computing device (or a processor in a remote server) may determine traces 402A-402C and 404A-404C based on the stored continuous trace. In one example traces 402A-402C and 404A-404C may be determined based on a measurement of at least one of the sensors being within a predetermined range for the duration of the trace. For example, a trace may be stored as one of traces 402A-402C and 404A-404C when either/or the magnetometer measurements show changes below a threshold amount for the trace duration and/or the accelerometer measurements show acceleration much less than gravity for the trace duration. In some examples, when these criteria for saving traces is met, there may be enough confidence in the accuracy of trace data to perform corrections on measured data.

In one example, the method flow 400 shows an example flow with which the methods described herein may be used. In one example, three traces 402A-402C may be analyzed in a forward direction. The traces 404A-404C may be analyzed in a backward direction. In some examples, the three traces 402A-402C may be the same traces as the three traces 404A-404C. Thus, in that example, the traces may be analyzed in both a forward and backward direction. In some other examples, the three traces 402A-402C may be different than the three traces 404A-404C.

The three traces 402A-402C may be analyzed in order based on the time at which the data of the trace was captured by the sensor. As further described with respect to FIG. 5, the traces 402A-402C may be used to determine a sensor offset. For example, a processor may iteratively analyze a plurality of traces. After a trace is analyzed a sensor offset may be determined for one or more sensors. A subsequent trace may be analyzed based on the determined sensor offset. The iterative process may be continued until the sensor offset converges to within a threshold value. Additionally, traces may be analyzed in either a forward in time or backward in time direction.

Figure 5:
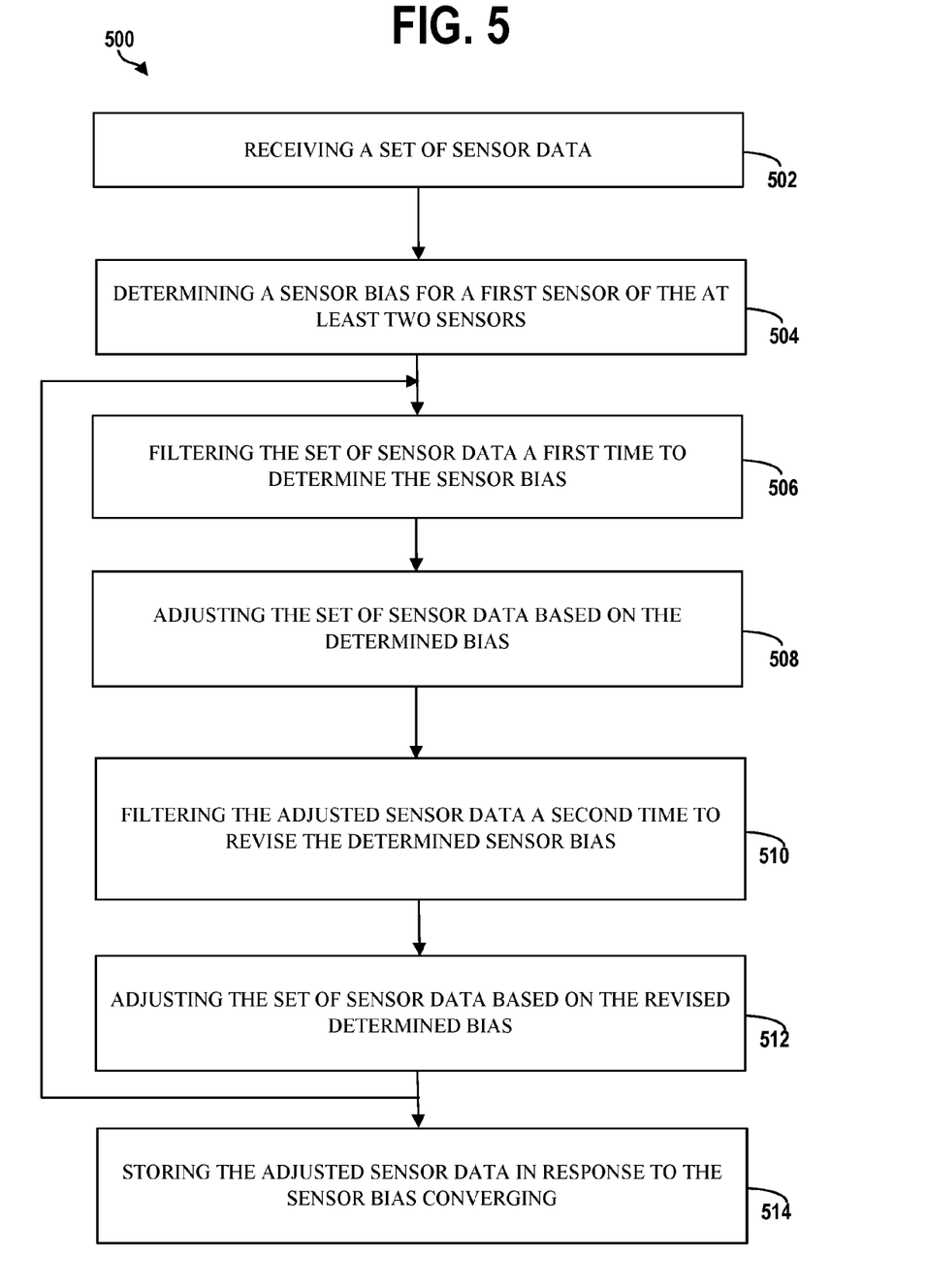
FIG. 5 is a block diagram of an example method that includes determining sensor offsets when determining a movement of a device.

FIG. 5 is a block diagram of an example method that includes determining sensor offsets when determining a movement of a device, in accordance with at least some embodiments described herein. Method 500 shown in FIG. 5 presents an embodiment of a method that, for example, could be used with the system 100 in FIG. 1, the device 200 in FIG. 2, the server 300 in FIG. 3, or the flow in FIG. 4, for example, or may be performed by a combination of any components or processes of FIGS. 1-4. Method 500 may include one or more operations, functions, or actions as illustrated by one or more of blocks 502-516. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

Functions of the method 500 may be fully performed by a computing device (or components of a computing device such as one or more processors), or may be distributed across multiple computing devices and/or a server. In some examples, the computing device may receive information from sensors of the computing device, or where the computing device is a server the information can be received from another device that collects the information. In some examples, method 500 may be performed multiple times with a different sensor having an offset calculated with each time method 500 is performed.

At block 502, a computing device, such as one or more of the client devices and/or servers discussed herein, receives sensor data or sensor data traces from one or more devices or components of the device(s). For instance, a client device may receive data traces from, or that are otherwise based on, the output of one or more sensors of the client device and/or of other client devices. In another example, a server may receive data traces from, or that are otherwise based on, the output from sensors of one or more client devices.

The data traces may include data collected by sensors of devices over a plurality of locations and over a plurality of time periods. The data traces also include data from at least two sensors and wherein the sensor data corresponds to a movement. A respective data trace may include data corresponding generally to a movement of the device, such as the movement of the device as a person having the device moves. A respective data trace may also include data corresponding generally to a horizontal location, such as GPS positioning data, magnetometer data, accelerometer data, and gyroscope data. The data traces may be received on a continual basis, or periodically as the logs are collected, such as every 5 seconds, a new log of data having data collected over the 5 second time period may be received. A data trace may also be associated with a timestamp, which allows a computing device or server to correlate different data traces collected by different sensors and/or by different devices.

Further, the data traces may include different combinations of data, or data associated with different timestamps. In these example data traces, the movement of the device may be stored based on changes in acceleration, magnetic fields, and information from a gyroscope. In other examples, the data in the data traces may be represented in other forms (e.g., raw data forms) that may need to be processed or converted for use by the computing device or server.

Figure 6:
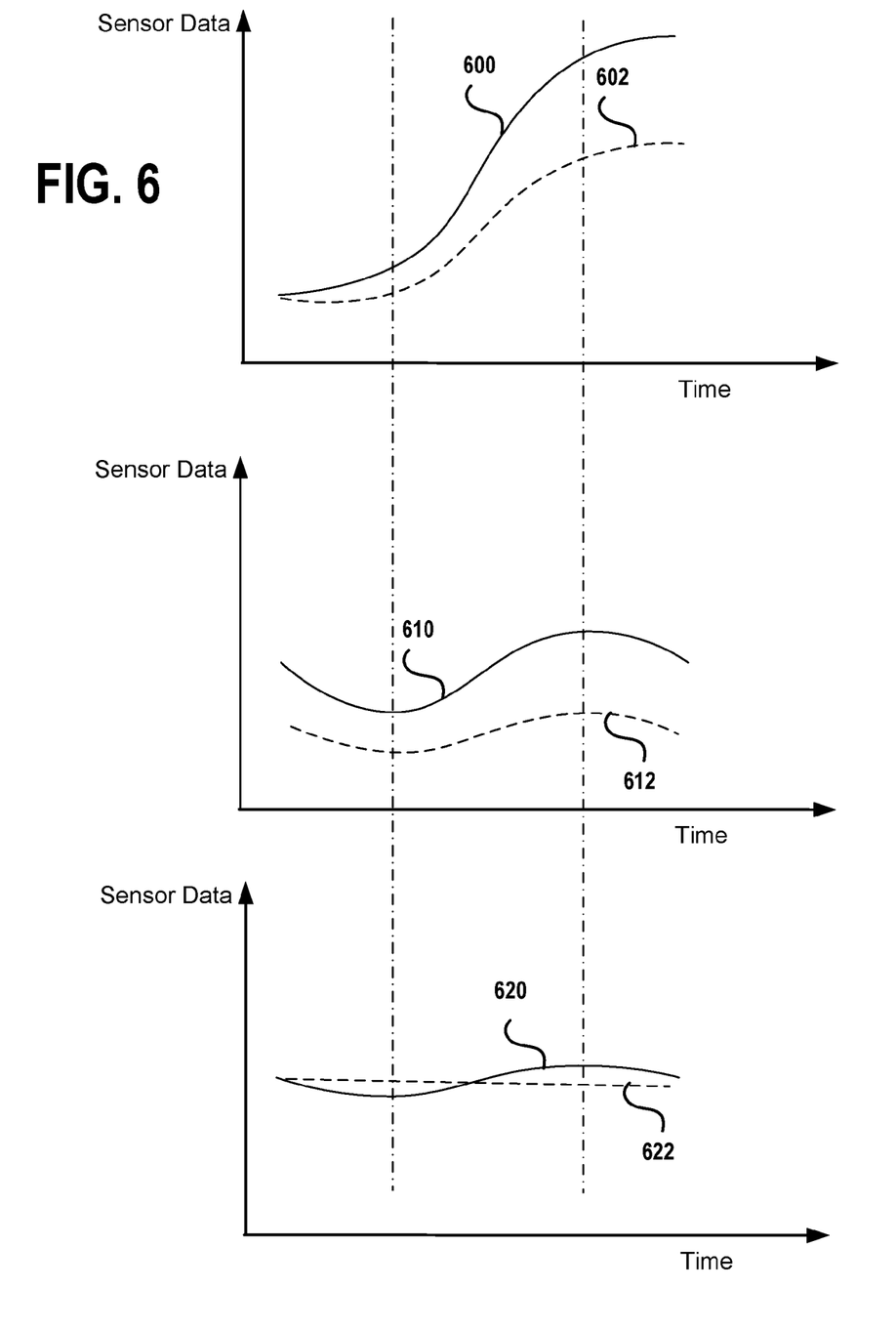
FIG. 6 illustrated example sensor data.

Referring to the illustrative example of FIG. 6, at block 502, a computing device or server receives a set of sensor data that may take the form of the traces of FIG. 6. As shown in FIG. 6, each data trace is represented by a solid line. The solid line of each trace represents the data received from the respective sensor. The dotted line represents the corrected sensor value (based on corrections applied later in the method). Trace 600 may correspond to data from a gyroscope. Trace 610 may correspond to data from an accelerometer. And, trace 620 may correspond to data from a magnetometer. Additionally, the period of time over which the traces are collected may be divided into a plurality of periods of time. As an example, the period of time may be divided into three periods. By dividing the traces into a different time intervals, a set of traces like those described with respect to FIG. 4 may be created. Further, the data traces in FIG. 6 are represented by smooth curved lines for illustrative purposes. The data in the data traces may actually be discrete, periodic data points, and the smooth curved lines may represent a best fit curve of the data.

At block 504, the computing device determines a sensor bias for a first sensor of the at least two sensors. The determination comprises iteratively performing at least a portion of blocks 506-512. The blocks 506-512 may be performed iteratively until the sensor bias converges within a convergence threshold. That is, a determined bias may be revised until the the iterative process determines a value for the sensor bias that does not change significantly between the iterations.

Further, the filtering performed may be performed in a forward in time and a backward in time direction. Additionally, with the various iterations, the sensor for which the bias is calculated. Thus, after many iterations, biases may be calculated for multiple sensors. Further, an initial set of measurements from the sensors may include errors (e.g., a direction of North, a heading of the movement, etc.). After the biases are calculated, the biases can be used to adjust sensor data stored in traces to determine a corrected initial set of measurements.

Additionally, the sensor bias may be determined based on Bayesian Filtering and/or Kalman filtering. Blocks 506-512 may perform the Bayesian and/or Kalman filtering to adjust the sensor data based on the determined filter offsets.

Bayesian filtering is a type of filtering that estimates an unknown probability density function based on a set of received data. A Bayesian filter may estimate the unknown probability density function by way of an iterative process. A Bayesian filter has two different portions. A first portion makes a prediction based on the received data. And, the Bayesian filter has a second portion, which is called an innovation, that is used to update the sensor information to cause a revised prediction. By iteratively creating predictions and innovations, the Bayesian filter may more accurately be able to determine correct sensor information. The iterative process may continue until the innovation stage produced a result that is small. When the innovation state produced a result that is small, the measurements may have converged to an accurate result. Additionally, in instance where the sensor data is linear and normally distributed, the Bayesian filter is equal to the Kalman filter, hence the filtering of the present application may be called Bayesian and/or Kalman filtering.

In practice, a mobile device may receive a set of sensor data related to location and movement information of the device. Each sensor may have a sensor bias. Over time, as the sensor bias may cause the data provided by the sensor to have an error that compounds. For example, what may be a small error at an initial time may increase over time. Thus, after a period of time sensor measurements may not be as usable. However, by using information from multiple sensors, filtering may be able to iteratively calculate and reduce or remove the sensor errors. In one examples, the sensors may be used to determine a heading and movement velocity of the device. The filtering may iteratively be performed in both the forward in time and the backward in time directions.

At block 506, the computing device filters the set of sensor data a first time to determine the sensor bias. The filtering determines sensor offsets that can be applied to correct the data received by the sensor (such as at block 508). During the first filtering, data from a first sensor of the two sensors is a control input and the filtering is performed based on data from a second sensor of the at least two sensors. In some further examples, data from two sensors may be used to corrected the data from the control sensor. For example, either the magnetometer or the accelerometer may be used as the control input and data from the gyroscope is filtered based on the control input.

In some examples, for the durations of a trace, either the magnetometer has a value that is relatively unchanged and/or the accelerometer has an acceleration much less than the acceleration due to gravity. Although the magnetometer or the accelerometer may include an error in the measurement, if the magnetometer has a value that is relatively unchanged and/or the accelerometer has an acceleration much less than the acceleration due to gravity it is assumed that the sensor data is sufficient to provide a correction to the gyroscope over the duration of the trace.

If the gyroscope has a sensor bias, the bias may cause measurement errors to compound. Therefore, over time, data provided by a gyroscope may become more and more inaccurate. Thus, by determining a sensor bias, it may be possible to correct the data from the gyroscope. In other examples, the sensor that is corrected may be a sensor other than the gyroscope. A gyroscope is used in here as an example sensor. In some examples, the gyroscope bias may be calculated by summing the magnetometer and accelerometer innovations (e.g. measurement corrections to be applied to the gyroscope measurements) over the trace divided by the trace duration. That is, for the duration of the trace, it is assumed that the magnetometer and accelerometer are providing accurate sensor data. Based on this assumption, a drift and/or an error in the gyroscope measurement may be determined. In various other examples, the sensors may be combined in various other ways to determine a drift and/or an error in the respective sensor measurement.

At block 508, the computing device adjusts the set of sensor data based on the determined bias. The sensor data may be adjusted by subtracting the determined sensor offset from the captured sensor data. In some examples, a non-time dependent value may be subtracted while in other examples, the value subtracted may be time dependent. In some examples, at block 508, the system will store the determined sensor bias and adjusted sensor data in a cache. By storing the adjusted sensor data in a cache, the system may perform the filtering of blocks 506-512 before the captured data stored in memory is actually adjusted.

When the last measurement of a trace is reached in the forward direction, the last computed orientation may be used as input for the backward iteration of the filtering. The last measurement in the forward direction may be treated as a new measurement (having sensor uncertainty) for the filter being operated in the backward direction (at block 510). The innovations (magnetometers and accelerometer corrections for the gyro control input) may be summed over the observation window and divided by the window duration to obtain an initial gyroscope bias estimate. The bias estimates from the first forward iteration are used as input for the first backward iteration. This is done by subtracting the bias estimates of the first forward iteration from the gyroscope measurements in the backward iteration.

At block 510, the computing device filters the adjusted sensor data a second time to revise the determined sensor bias. The filtering is performed based on data from a second sensor of the at least two sensors. The filtering at block 510 may be similar to the filtering performed at block 506. In some examples, block 510 may perform the filtering in a direction opposite in time to the filtering at block 506. In some other examples, block 510 may perform the filtering in the same direction in time to the filtering at block 506. Additionally, block 510 may be performed on the adjusted sensor data in the cache from block 508.

At block 512, the computing device adjusts the set of sensor data based on the revised determined bias. The adjusting at block 512 may be similar to the adjusting performed at block 508. Further, the adjusting at block 512 may also store the adjusted data in a cache.

After block 512, the system may determine whether or not the sensor corrections have converged within a threshold amount (e.g., corrects are showing less than a 1% change between subsequent iterations). For example, if the iterative process of blocks 506-512 shows little or no difference in offset calculations between two different measurements (or a difference less than a threshold amount), the system may determine that accurate offsets have been calculated. When accurate offsets have been calculated, the method may move to block 514. If accurate offsets have not been calculated, the method may move back to block 506 and perform another iteration.

At block 514, the computing device stores the adjusted sensor data in a memory in response to the sensor bias converging. The raw sensor data may have the corrections calculated as part of the iterative process of blocks 506-512 subtracted from the raw sensor data to save the adjusted sensor data. In another example, the adjusted sensor data stored in a cache at block 512 may be stored in the memory to save the adjusted sensor data.

As shown in FIG. 6, trace 600 may correspond to data from a gyroscope and trace 602 may correspond to adjusted data from the gyroscope. Trace 610 may correspond to data from an accelerometer and trace 612 may correspond to adjusted data from an accelerometer. Additionally, trace 620 may correspond to data from a magnetometer and trace 622 may correspond to adjusted data from a magnetometer. The adjusted traces 602, 612, and 622 may be stored in memory and used by the system to determine location information. For example, an initial absolute heading may be calculated based on the adjusted traces (i.e. adjusted sensor data).

Figure 7:
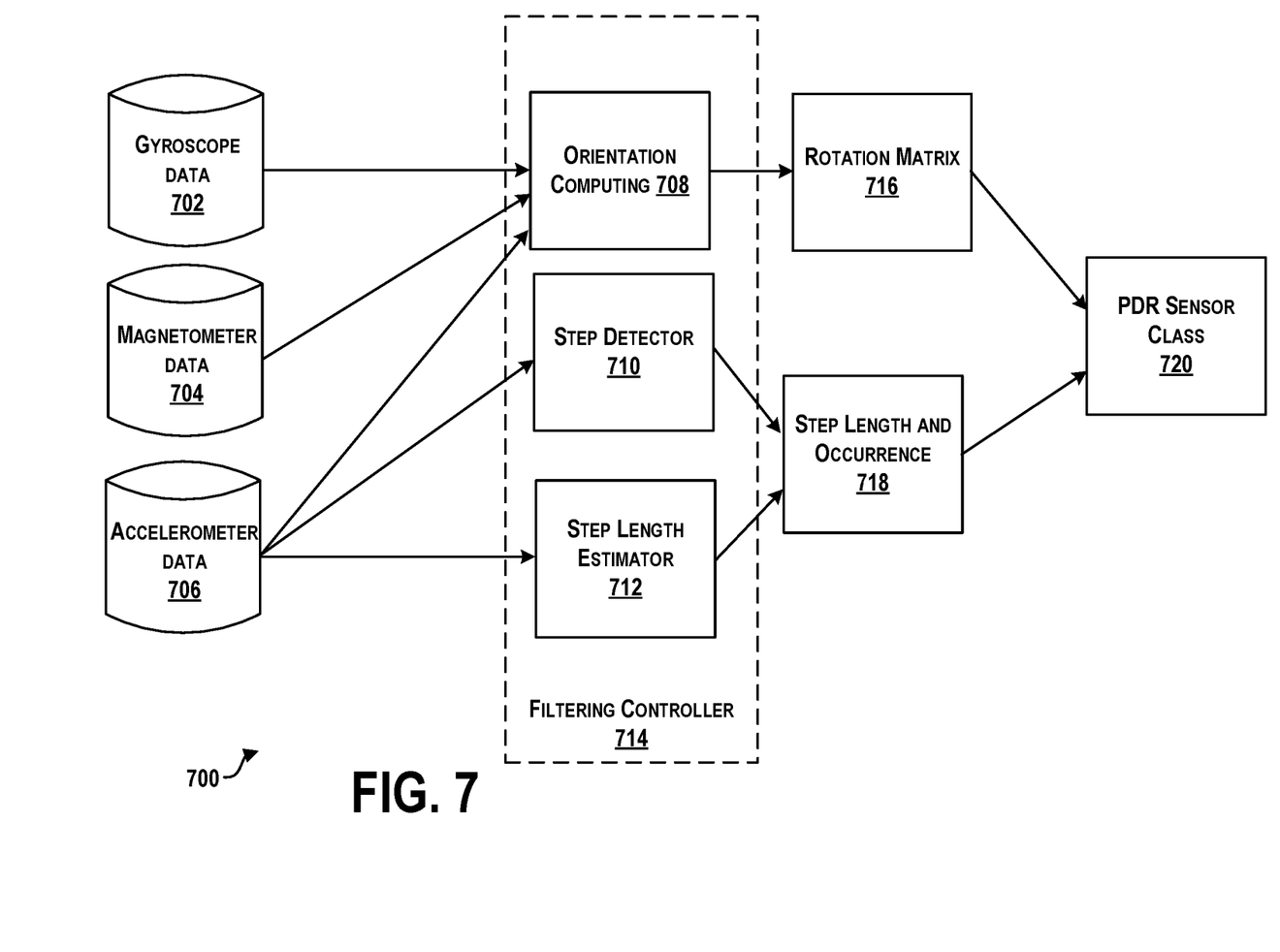
FIG. 7 is a block diagram that conceptually illustrates an example system for determining sensor offsets.

FIG. 7 is a block diagram that conceptually illustrates an example system 700 for determining locations as a Pedestrian Dead Reckoning (PDR) Sensor Class 720. Any of the blocks in the system 700 may be modules, processors, or other devices, or may take the form of instructions executable by processors to perform the associated function. The system 700 may operate with gyroscope data 702, magnetometer data 704, and accelerometer data 706. Each of gyroscope data 702, magnetometer data 704, and accelerometer data 706 may be data stored from the respective sensor associated with the data. Each sensor may be sampled at a predetermined interval to determine the respective sensor data. The gyroscope data 702, magnetometer data 704, and accelerometer data 706 may be used by example system 700 in order to determine the PDR.

The gyroscope data 702, magnetometer data 704, and accelerometer data 706 can be used to determine various movement parameters. Orientation Computing block 708 may use gyroscope data 702, magnetometer data 704, and accelerometer data 706 to determine an orientation of the device. For examples, the Orientation Computing block 708 may determine an orientation or heading for the device. The orientation may include the direction in which the device is facing. The Step Detector block 710 may receive the accelerometer data 706 and determine when a person holding the device takes a step. The Step Length Estimator block 712 may receive the accelerometer data 706 and determine the length of a step when a person holding the device takes a step.

Each of Orientation Computing block 708, Step Detector block 710, and the Step Length Estimator block 712 are shown within the Filtering Controller Block 714. The Filtering Controller Block 714 indicates that the Orientation Computing block 708, Step Detector block 710, and the Step Length Estimator block 712 may each operate on data that has been filtered. The filtering of the data may have been performed by a filtering similar to that described with respect to FIG. 5. Further, because each of Orientation Computing block 708, Step Detector block 710, and the Step Length Estimator block 712 may operate on the filtered data, their outputs may be more accurate than if each block operated upon raw sensor data.

The output of the Orientation Computing block 708 may be used by a Rotation Matrix block 716. The Rotation Matrix block 716 may determine the rotation of the device. The outputs of the Step Detector block 710, and the Step Length Estimator block 712 may be fed into a Step Length and Occurrence block 718. The Step Length and Occurrence block 718 can output the walking parameters of the person with the device (e.g. a length of the step and the frequency of steps). The outputs of the Rotation Matrix block 716 and the Step Length and Occurrence block 718 may form the PDR Sensor Class 720. The PDR Sensor Class 720 may be a class that can be called by software to determine motion parameters of the device. For example, an application running on a mobile device may be a run tracking application. As a person runs with his or her device, the PDR Sensor Class 720 may output information that the application can use to detail parameters of the person's run.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

It should also be understood that for situations in which the embodiments discussed herein collect and/or use any personal information about users or information that might relate to personal information of users, the users may be provided with an opportunity to opt in/out of programs or features that involve such personal information (e.g., information about a user location). In addition, certain data may be anonymized in one or more ways before it is stored or used, so that personally identifiable information is removed. For example, a user's location may be anonymized so that no personally identifiable information can be determined for the user and so that any identified user preferences or user interactions are generalized (for example, generalized based on user demographics) rather than associated with a particular user.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

We claim:

1. A method comprising:
receiving a set of sensor data, wherein the set of sensor data comprises data from at least two movement sensors of a device and wherein the sensor data corresponds to a movement of the device, and wherein the movement sensors include at least one of a gyroscope, a magnetometer, and an accelerometer;
communicating at least a subset of the set of sensor data to a remote server;
determining a sensor bias for a first sensor of the at least two movement sensors by iteratively:
filtering data from a first sensor of the two movement sensors a first time to determine the sensor bias based on data from a second sensor of the at least two movement sensors, and wherein the filtering of the data the first time filters the data in one of a forward-in-time direction or a backward-in-time direction;
adjusting the set of sensor data based on the determined bias;
filtering the data from the first sensor a second time to revise the determined sensor bias, wherein the filtering is performed based on the data from the second sensor of the at least two movement sensors, and wherein the filtering of the data the second time filters the data in the other one of the forward-in-time direction or the backward-in-time direction;
adjusting the set of sensor data based on the revised determined bias; and
storing the adjusted sensor data; and
supplementing the adjusted sensor data based on calculations performed by the server.

2. The method of claim 1, wherein:
the filtering of the set of sensor data the first time is further based on data from a third sensor of the at least two sensors; and
the filtering of the set of sensor data the second time is further based on data from a third sensor of the at least two sensors.

3. The method of claim 2, wherein the third sensor is one of a magnetometer and an accelerometer.

4. The method of claim 1, wherein the first sensor is a gyroscopic sensor and wherein the second sensor is one of a magnetometer and an accelerometer.

5. The method of claim 1, wherein the filtering is performed with a Bayesian filter.

6. The method of claim 1, wherein the filtering of the set of sensor data the first time filters the data in a forward-in-time direction and the filtering of the set of sensor data the second time filters the data in a backward-in-time direction.

7. The method of claim 1, wherein the set of sensor data is received from a mobile device and wherein the method further comprises communicating the revised determined bias in response to the sensor bias converging.

8. A non-transitory computer-readable medium having stored thereon program instructions that when executed by one or more processors cause performance of functions in connection with a computing device, the functions comprising:
receiving a set of sensor data, wherein the set of sensor data comprises data from at least two movement sensors of a device and wherein the sensor data corresponds to a movement of the device, and wherein the movement sensors include at least one of a gyroscope, a magnetometer, and an accelerometer;
communicating at least a subset of the set of sensor data to a remote server;
determining a sensor bias for a first sensor of the at least two movement sensors by iteratively:
filtering data from a first sensor of the two movement sensors a first time to determine the sensor bias based on data from a second sensor of the at least two movement sensors, and wherein the filtering of the data the first time filters the data in one of a forward-in-time direction or a backward-in-time direction;
adjusting the set of sensor data based on the determined bias;
filtering the data from the first sensor a second time to revise the determined sensor bias, wherein the filtering is performed based on the data from the second sensor of the at least two movement sensors, and wherein the filtering of the data the second time filters the data in the other one of the forward-in-time direction or the backward-in-time direction;
adjusting the set of sensor data based on the revised determined bias; and
storing the adjusted sensor data; and
supplementing the adjusted sensor data based on calculations performed by the server.

9. The computer-readable medium of claim 8, wherein:
the filtering of the set of sensor data in the first direction to determine the sensor bias is further based on data from a third sensor of the at least two sensors; and
the filtering of the set of sensor data in the second direction to determine the sensor bias is further based on data from a third sensor of the at least two sensors.

10. The computer-readable medium of claim 9, wherein the third sensor is one of a magnetometer and an accelerometer.

11. The computer-readable medium of claim 8, wherein the first sensor is a gyroscopic sensor and wherein the second sensor is one of a magnetometer and an accelerometer.

12. The computer-readable medium of claim 8, wherein the filtering is performed with a Bayesian filter.

13. The computer-readable medium of claim 8, wherein the filtering of the set of sensor data the first time filters the data in a forward-in-time direction and the filtering of the set of sensor data the second time filters the data in a backward-in-time direction.

14. The computer-readable medium of claim 8, wherein the set of sensor data is received from a mobile device and wherein the method further comprises communicating the revised determined bias in response to the sensor bias converging.

15. A mobile device comprising:
a plurality of movement sensors, wherein the plurality of sensors comprises at least two movement sensors;
a processor configured to:
receive a set of sensor data, wherein the set of sensor data comprises data from at least two movement sensors of a device and wherein the sensor data corresponds to a movement of the device, and wherein the movement sensors include at least one of a gyroscope, a magnetometer, and an accelerometer;
communicate at least a subset of the set of sensor data to a remote server;
determine a sensor bias for a first sensor of the at least two movement sensors by iteratively:
filtering data from a first sensor of the two movement sensors a first time to determine the sensor bias based on data from a second sensor of the at least two movement sensors, and wherein the filtering of the data the first time filters the data in one of a forward-in-time direction or a backward-in-time direction;
adjusting the set of sensor data based on the determined bias;
filtering the data from the first sensor a second time to revise the determined sensor bias, wherein the filtering is performed based on the data from the second sensor of the at least two movement sensors, and wherein the filtering of the data the second time filters the data in the other one of the forward-in-time direction or the backward-in-time direction;
adjusting the set of sensor data based on the revised determined bias; and
supplementing the adjusted sensor data based on calculations performed by the server;
a memory configured to store the adjusted sensor data in a memory.

16. The mobile device of claim 15, wherein:
the filtering of the set of sensor data in the first direction to determine the sensor bias is further based on data from a third sensor of the plurality of movement sensors; and
the filtering of the set of sensor data in the second direction to determine the sensor bias is further based on data from a third sensor of the plurality of movement sensors.

17. The mobile device of claim 16, wherein the third sensor is one of a magnetometer and an accelerometer.

18. The mobile device of claim 15, wherein the first sensor is a gyroscopic sensor and wherein the second sensor is one of a magnetometer and an accelerometer.

19. The mobile device of claim 15, wherein the filtering is performed with a Bayesian filter.

20. The mobile device of claim 15, wherein the filtering of the set of sensor data the first time filters the data in a forward-in-time direction and the filtering of the set of sensor data the second time filters the data in a backward-in-time direction.

* * * * *